Figure 1:
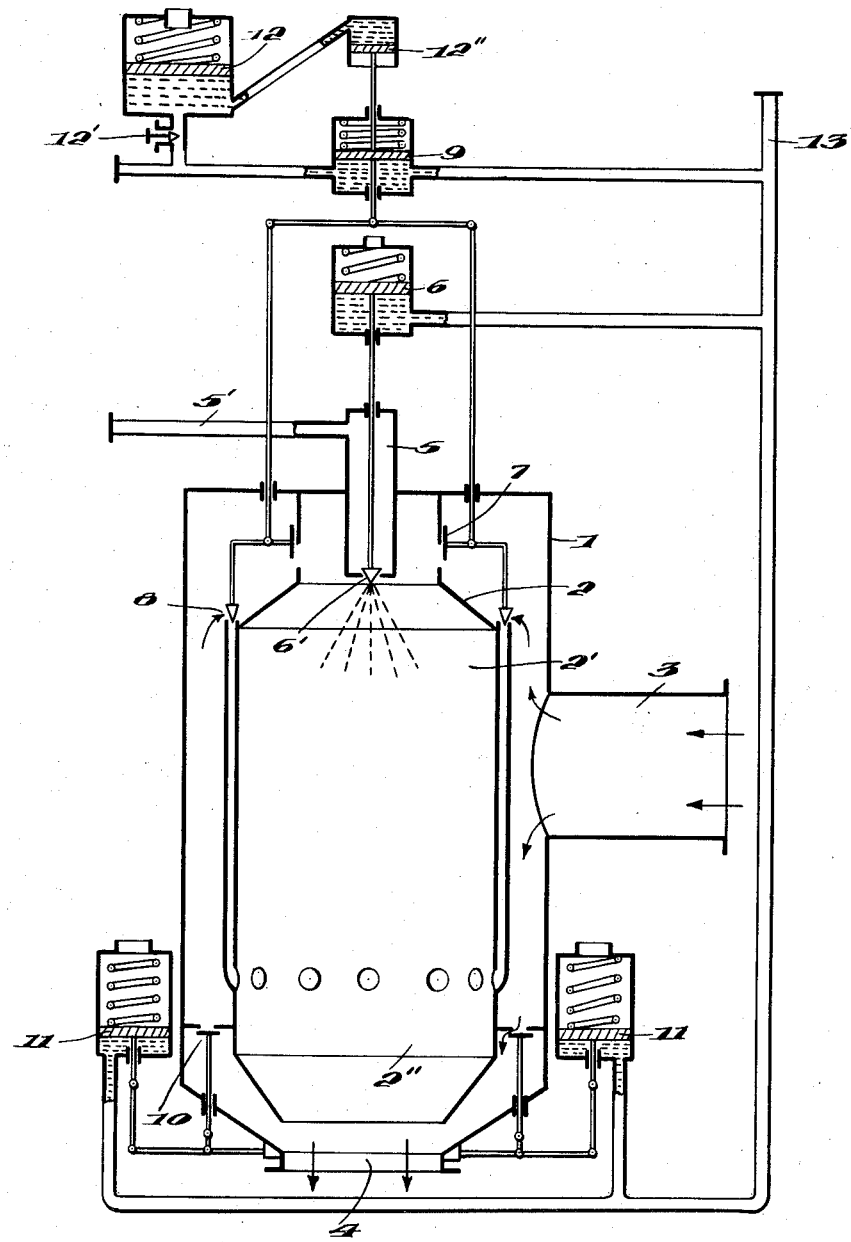

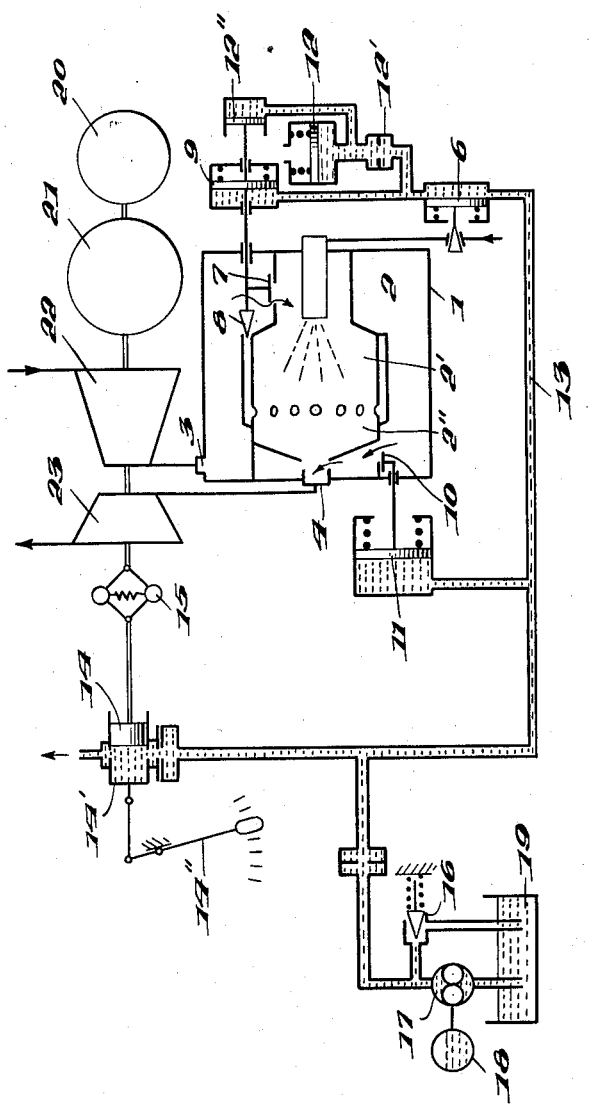

United States Patent Office 2,837,894
Patented June 10, 1958

2,837,894

AUTOMATIC AIR REGULATING DEVICE IN COMBUSTION CHAMBERS OF GAS TURBINE PLANTS

Camillo Kind, Zurich, Switzerland, assignor to Aktiengesellschaft Brown, Boveri & Cie., Baden, Switzerland, a joint stock company Application December 5, 1955, Serial No. 551,145

Claims priority, application Switzerland December 18, 1954

1 Claim. (Cl. 60—39.27)

This invention relates to the gas turbine art, and is concerned with means for automatically regulating the air supply to the combustion chamber of a gas turbine plant.

For the production of working gases in gas turbine plants, there generally are employed a combustion chamber which includes a combustion zone proper, where the fuel is burnt, and a mixing zone. In the mixing zone there is added to the combustion gases so much additional air that the temperature of the working gas corresponds to the value desired at the inlet of the gas turbine. The apportioning of the amount of primary air necessary for the combustion zone and of the amount of secondary and tertiary air required for the mixing zone, heretofore has been regulated, either by branching off an air current directly from the compressor, or by separate air supply lines, or by selecting suitable air-inlet cross-sections in the body of the combustion chamber. To this end, adjustable members have been used to facilitate the final proportioning of the various amounts of air. It has also been suggested to use an auxiliary blower (booster) for the delivery of the combustion air. A device for the continuous adaptation of the various amounts of air to the varying loads has not been developed so far.

It has been found desirable to have an automatic device for regulating the amount of air necessary in the combustion chamber of a gas turbine plant, which device insures for each load of the turbine the optimum air distribution in the combustion zone and in the mixing zone, without the necessity of an adjustment of the regulating members by the operating personnel. The present invention concerns, then, an automatic air-regulating device in the combustion chamber of a gas turbine plant, and it is characterized by means which utilize the regulating impulse determining the fuel supply for regulating the amount of air.

In the attached drawing Fig. 1 shows schematically an embodiment of an air regulating device according to the invention; and Fig. 2 shows schematically a complete gas turbine plant including essential components of a regulating system therefor.

The combustion chamber enclosed by the outer wall 1 includes an inner container 2 which encloses a combustion zone 2' and a mixing zone 2". At 3 is arranged the air inlet of the combustion chamber, and at 4 the gas outlet. The fuel nozzle 5 is supplied with fuel by the supply line 5', the fuel supply being regulated at varying load of the plant by means of a power piston 6 actuating a fuel valve 6'. At 7 is arranged a primary air-slide valve acting as a throttle, and at 8 the valves of a cooling air regulator, the supply of the cooling air to the mixing zone of the combustion chamber being so arranged that the cooling air at the same time passes in heat-transferring contact with and cools the inner container 2 of the combustion chamber. The regulation of the combustion air and of the cooling air is effected by means of the power piston 9. A mixed air-slide valve, represented at 10, acts as a secondary air throttle and supplies the necessary air to the mixing zone 2" to reduce the working gas temperature in the vicinity of the gas outlet 4. The regulation of the mixed air is effected by a power piston 11.

At 12 is arranged a spring-biased accumulating piston which represents, together with the adjusting throttle 12' and the compensating power piston 12", a retarding and accelerating device, respectively; it corrects temporary deviations from the states of equilibrium, caused by the inertia of the gas turbine group. The housing of this accumulating piston, as that of all power pistons, is connected to the pressure oil line 13. In the oil supply line to the accumulating piston is arranged an adjusting throttle 12'.

The correlation of the regulating system with respect to a gas turbine plant is illustrated in Fig. 2. The gas turbine plant is seen to comprise a compressor 22 receiving air from atmosphere to be compressed, the compressor being driven by a gas turbine 23. The compressor delivers compressed air to combustion chamber 1 through air inlet 3, whilst the gas turbine receives gaseous combustion products from combustion chamber 1 via gas outlet 4. A starting motor is represented at 20. At 21 is represented an electrical generator, or other type of useful load, driven by gas turbine 23.

The regulating system is composed of a valve piston 14 which is connected to a ball governor 15 running off of the output shaft 15' of the turbine-compressor-load group. Valve piston 14 is contained in and forms a component of a sleeve governor valve 14'. A controller liner 14" is operatively associated with sleeve governor valve 14' and serves to adjust the sleeve of valve 14' in order thereby to vary the oil pressure in the pressure oil regulating system, including line 13, whereby to obtain a different speed of the gas turbine plant. Such an adjustment may be required if the load 21 is a D. C. generator or other machine running at different speeds. In case the turbine drives an A. C. generator at constant speed, the controller lever 14" and with it the sleeve of the governor valve 14' remain in fixed position.

At 19 is shown an oil sump from which oil is pumped, by oil pump 17 driven by motor 18 into regulatory pressure oil line 13. As the load on the gas turbine 23 varies, the pressure exerted by valve piston 14 on the oil in regulatory pressure oil line 13 commensurately varies, and the pressure impulse is transmitted to the power piston 6 for varying the fuel supply to the combustion zone and to the power piston 9 for regulating the quantities of primary air (combustion air) at valve 7 and secondary air (cooling air) at valves 8, and to power piston 11 for regulating the quantity of tertiary air (mixing air) at valve 10.

When the load on the turbine increases, the regulating oil pressure rises in the line 13 and in the pressure chamber of the connected operating pistons 6, 9 and 11. The pressure in the cylinder 12" rises at the same rate as the oil can enter the chamber 12 through the throttle 12' and displace the spring piston 12. The fuel nozzle 5 thereby is opened wider by the power piston 6, while the piston 9 simultaneously opens the cross-section of the passage of the primary air-slide valve 7 and of the valves 8 of the cooling air regulator. The cross-sections of the mixed air-slide valve 10 are reduced by means of the power piston 11 to prevent the pressure level in front of the combustion chamber from dropping too low.

The accumulating piston 12 acts with the power piston 12" as a gradient regulator since, when the pressure rises in the line 13, the corresponding pressure acts on the piston 12" only after a certain time. The result of this delay is, at first, a wider opening of the slide valve 7 and of the valves 8 than is desirable in the state of equilibrium. Since the increase in the speed of the turbo group in accelerating processes lags behind that of the fuel supply, and thus also the amount of air delivered by the compressor 22 to the combustion chamber 1, it is of advantage that the slide valve for the combustion air have a greater cross-section than in the state of equilibrium. Similar is the behavior of the device if the oil pressure drops in the line 13, so that the gas turbine group is adjusted for a lower output.

The above described device has the following advantages: The known regulating devices did not permit operation of gas turbine plants in wide load ranges, because it was not possible always to maintain the correct fuel/air ratio required for the complete combustion of the fuel. By adapting the amount of air continuously to the amount of fuel, it is now possible by means of the above described device to obtain the desired mixture at all operating levels, without the necessity of any regulation by the operating personnel in the event the load varies. This results in a better adaptation of the plant to the operational requirements and in a longer life of the combustion chamber parts.

I claim:

Apparatus for supplying working gas to the gas turbine plant, which comprises a combustion chamber providing a combustion space and an adjacent mixing space, a valved fuel inlet in operative association with said combustion space, a valved primary air inlet in operative association with said combustion space, a valved secondary air inlet in operative association with said mixing space, a valved tertiary air inlet in operative association with said mixing space, a regulatory pressure oil line in operative association with said gas turbine the variable pressure on said oil being commensurate with the variable load on said gas turbine, a first means responsive to variation in pressure of said oil to vary the setting of the fuel inlet valve, a second means responsive to variation in pressure of said oil to vary the setting of the tertiary air inlet valve, a third means likewise responsive to variation in pressure of said oil to vary the settings of the primary and secondary air inlet valves, and a retarding-accelerating device, including an oil accumulator and a compensator operatively associated therewith, in said pressure oil line to modify the rate of operation of said third means.

References Cited in the file of this patent

UNITED STATES PATENTS

| | | |
|---|---|---|
| 2,618,926 | Pfenninger | Nov. 25, 1952 |
| 2,670,598 | Van Millingen | Mar. 2, 1954 |